United States Patent [19]
Holley et al.

[11] Patent Number: 5,580,170
[45] Date of Patent: Dec. 3, 1996

US005580170A

[54] MIXING AND CONDITIONING MACHINE

[75] Inventors: Carl A. Holley, Riverview; Kurt B. Albert, Woodhaven, both of Mich.

[73] Assignee: Ferro-Tech, Inc., Wyandotte, Mich.

[21] Appl. No.: 540,576

[22] Filed: Oct. 6, 1995

[51] Int. Cl.⁶ .................................................. B01F 7/04
[52] U.S. Cl. ........................ 366/325.1; 366/64; 366/168.1
[58] Field of Search .................................. 366/6, 68, 61, 366/50, 51, 186, 190, 279, 325.1, 325.3, 325.4, 325.5, 325.8, 325.92, 327.1, 329.1, 329.2, 331, 168.1

[56] References Cited

U.S. PATENT DOCUMENTS 3,162,428  12/1964  Lödige et al. .
3,945,616   3/1976  Lödige et al. .
4,088,577   5/1978  Müller .
4,159,181   6/1979  Perrine .
4,344,692   8/1982  Oda .................................. 366/325.8
4,390,285   6/1983  Dürr et al. .
4,441,821   4/1984  Burkhart .............................. 366/61
4,551,024  11/1985  Clapp ................................... 366/50
4,705,222  11/1987  Shohet .

5,018,673   5/1991  Eirich et al. .

*Primary Examiner*—Robert W. Jenkins
*Attorney, Agent, or Firm*—Barnes, Kisselle, Raisch, Choate, Whittemore & Hulbert, P.C.

[57] ABSTRACT

A mixing and conditioning machine for turning dust and very fine particles into pellets comprising an elongated, generally horizontal trough formed of flexible rubber-like material having a downwardly concave arcuate bottom wall and vertical side walls. A rotor assembly comprises an elongated, generally horizontal shaft extending lengthwise within a trough with paddles distributed along the length of the shaft. The shaft is rotated to cause the paddles to mix and pelletize material introduced into the trough at the inlet end and move the material to the outlet end for discharge. The side walls of the trough are attached to the machine frame at points located a substantial distance above the bottom wall so that the trough is suspended from the points of attachment and enabled to flex as the shaft rotates, preventing build-up of material in the trough. Some of the paddles may have angled surfaces which urge the material towards the receiving end to increase the length of time the material remains in the trough and accordingly increase the amount of mixing of the material before it is discharged.

30 Claims, 5 Drawing Sheets

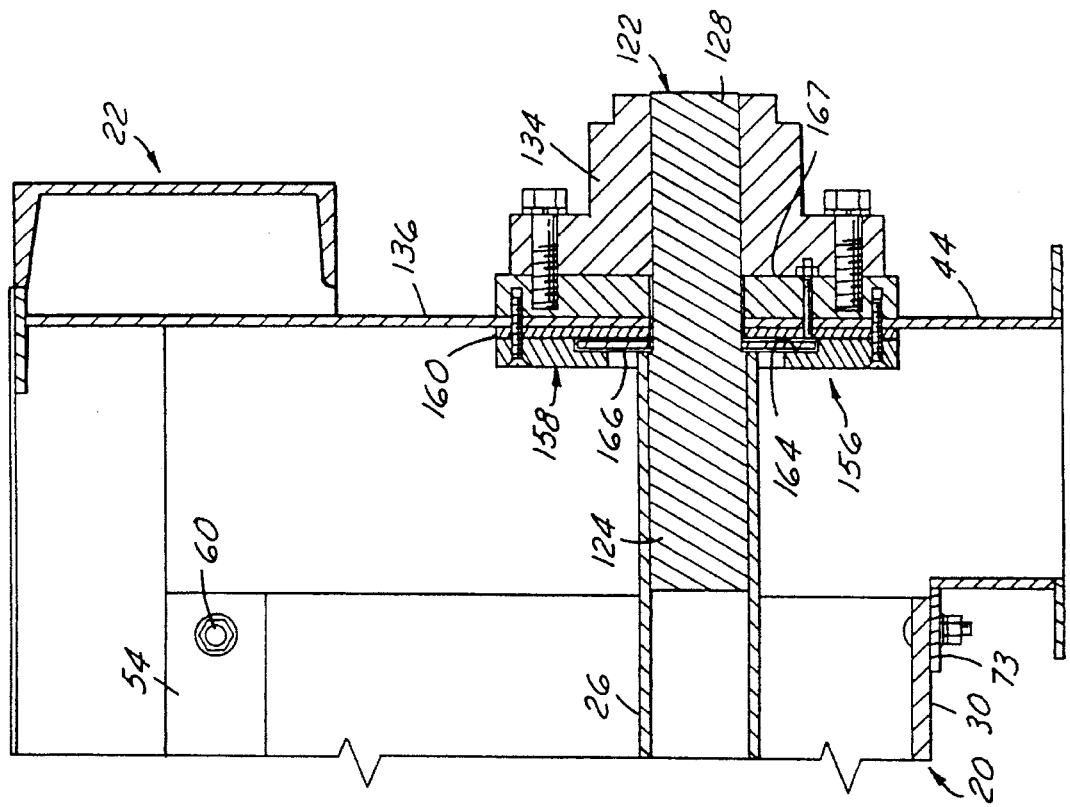
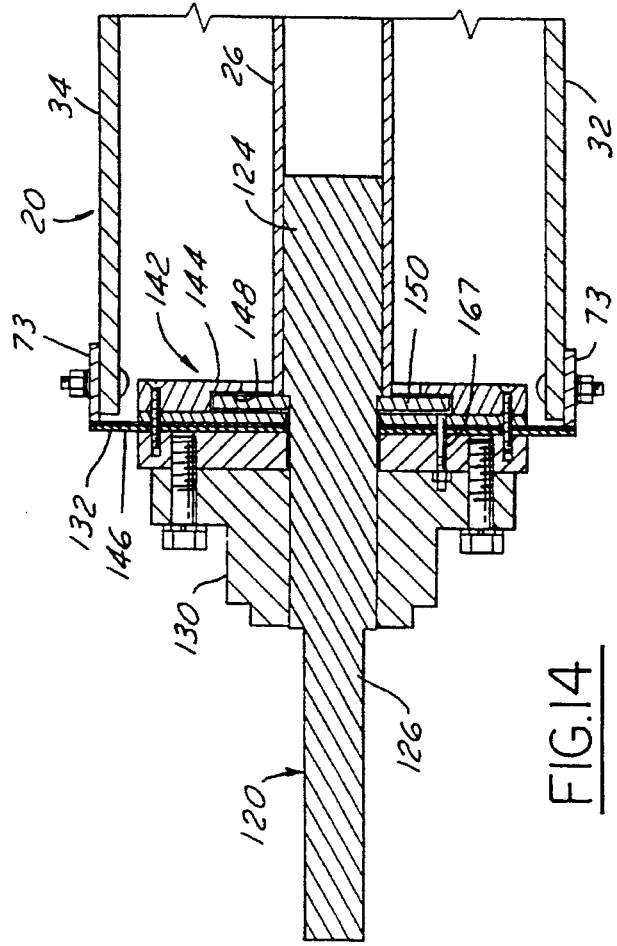
FIG. 15
FIG. 14

MIXING AND CONDITIONING MACHINE

FIELD OF INVENTION

This invention relates generally to a mixing and conditioning machine and more particularly to a machine for converting dust, powder, and other very fine particles into pellets.

BACKGROUND OF THE INVENTION

Dusty conditions exist in connection with many-business and industrial activities. Dust is generated by electric furnaces, cement kilns, foundries, and coal burning furnaces and is often present in land fills.

There is a need to reduce the amount of dust in the atmosphere for environmental and health reasons. This can be done by converting the dust into pellets. There is also a need to mix dry, fine powders and pasty, sticky sludges to produce a granular product that is "free-flowing". This need also exists in connection with the stabilization of flue gas desulfurization sludges with fly ash and other dry powders. Some additional applications are the granulation of agricultural chemicals, granulation of blended fertilizers, slaking of lime (CaO) to produce hydrated lime $(CaOH)_2$, granulation of fly ash which contains a high proportion of lime (CaO), and blending of several dry ingredients to produce a homogenous mix.

SUMMARY OF THE INVENTION

In accordance with the present invention, a mixing and conditioning machine is provided which is capable of quickly and efficiently converting dust, powders and other fine products into pellets which are environmentally safe and easy to handle. The machine mixes a liquid, usually water, with dust to encapsulate the dust particles. A suitable liquid binder may also be added.

The machine comprises an elongated generally horizontal trough having an inlet end and an outlet or discharge end. The trough has a downwardly concave bottom wall and laterally spaced side walls. A rotor assembly comprises an elongated shaft extending lengthwise within the trough having a plurality of paddles extending transversely of the shaft. Rotation of the shaft causes the paddles to mix and pelletize material introduced into the trough and move the material toward the outlet end for discharge. The trough is made of a flexible material and is suspended from the top edges of the side walls so that the entire trough is free to flex as the shaft rotates and thereby prevents the build-up of material in the trough.

Preferably, the trough is supported along its length by a plurality of stirrups which are spaced from one another and support the trough but without inhibiting the ability of the trough to flex during the operation of the rotor. The points of attachment of the side walls of the trough to the machine frame are spaced above the axis of rotation of the shaft preferably by a distance equal to about ¾ of the width of the trough. This greatly enhances the ability of the entire trough to flex during mixing and thereby prevents material being processed from building up on the trough. Some of the dust that may be treated in this machine is pozzuolanic and any material build-up will set up and become very hard. The hardened material has a wearing action on the paddles and requires additional powder to rotate the paddles.

The paddles are preferably arranged helically in spaced apart relation along the length of the shaft. Each paddle has a blade at the outer end provided with an angled surface on one side for axially moving the material in the trough toward the outlet end when the shaft is rotated. In some cases, the angled surface of the blade of one or more of the paddles faces the inlet end while the angled surfaces of the blades of the remaining paddles face the outlet end to increase the mixing action and the amount of time the material remains within the trough. The tip speed of the blades may vary, but preferably is 700 to 900 feet per minute.

One object of the invention is to provide a mixing and conditioning machine having the foregoing features and capabilities.

Another object is to provide a mixing and conditioning machine which is composed of a relatively few simple parts, is rugged and durable in use, and is capable of relatively inexpensive manufacture and assembly.

Other objects, features, and advantages of the invention will become more apparent as this description proceeds, especially when considered with the accompanying drawings.

BRIEF DESCRIPTION OF THE DRAWINGS

FIG. 14 is a fragmentary sectional view showing the seal arrangement for one end of the shaft of the rotor assembly.

. FIG. 15 is a fragmentary sectional view showing the seal arrangement for the other end of the shaft of the rotor assembly.

DETAILED DESCRIPTION OF THE PREFERRED EMBODIMENTS

Figure 1:
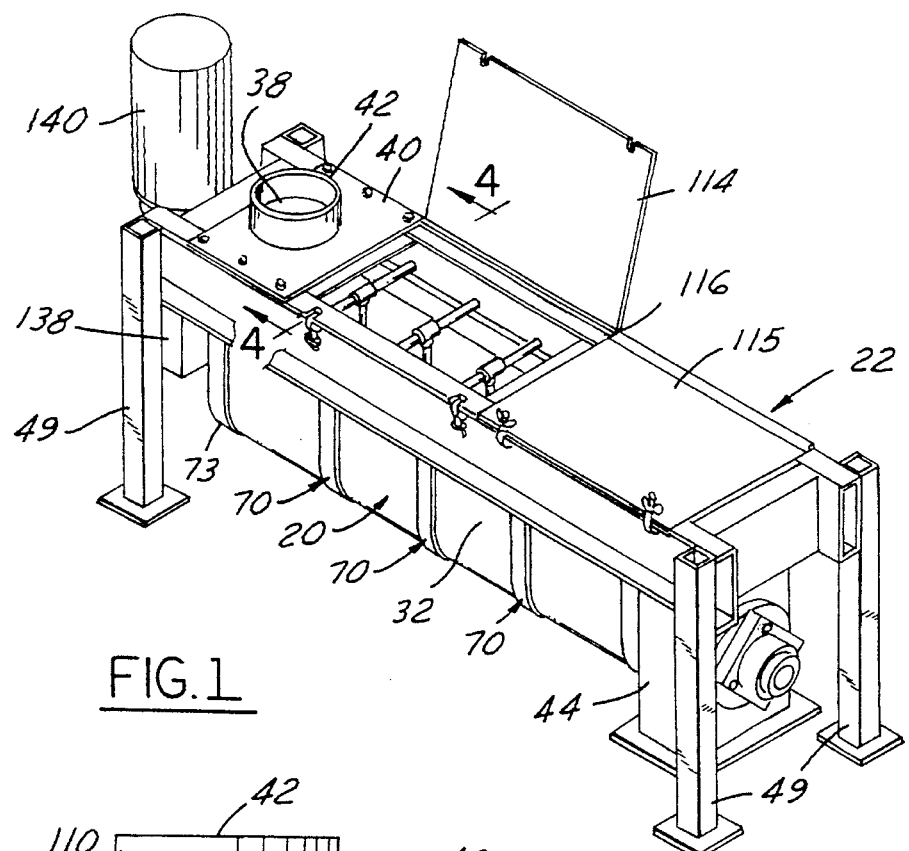
FIG. 1 is a perspective view of a mixing and conditioning machine constructed in accordance with the invention, with one of the top panels of the machine frame open.

Referring now more particularly to the drawings, the machine of this invention comprises an elongated horizontal trough 20 extending lengthwise within and supported by an elongated machine frame 22. A rotor assembly 24 comprising an elongated horizontal shaft 26 extends lengthwise within the trough and has paddles 28 for mixing and conditioning material in the trough.

The trough 20 preferably is made of a flexible material such, for example, as ¼" to 1" thick, 40 to 45 durometer soft natural rubber, butyl rubber, polyurethane or other flexible plastic material and preferably has a reinforced backing 29 on its outer surface. The reinforced backing may be any suitable reinforcing material such as open weave cotton, nylon or rayon fabric which can be glued or cast on the outside of the flexible material.

The trough 20 has a downwardly concave, arcuate bottom wall 30 which is semi-cylindrical, and of uniform semi-circular form throughout its length. The trough 20 has vertical side walls 32 and 34 which are integral with and extend upwardly from the opposite side edges 36 of the bottom wall and are disposed in laterally spaced apart, parallel vertical planes. There is an inlet 38 through a top panel 40 of the machine frame adjacent one end, defined by an inlet tube 42. There is an outlet tube 44 just beyond the opposite end of the trough. Material to be processed is introduced to the trough through inlet 38 and discharged through outlet tube 44. The length of the trough from the inlet to the outlet is preferably 4 to 5 times its width.

The upper edge portions 46 of the side walls of the trough are secured to horizontal channels 47 and 48. The channels 47 and 48 extend lengthwise of the frame and are supported above the floor or other supporting surface by legs 49. More specifically, the upper edge portions 46 of the side walls of the trough are clamped between the vertical bases 50 of the respective channels 47,48 and the elongated horizontal metal strips or bars 54. The bars 54 are removably secured to the channel bases 50 by suitable fasteners 60 so that the trough is suspended from the upper edges of its side walls.

The clamped upper edge portions 46 of the side walls of the trough are spaced above the centerline of the shaft 26 of the rotor assembly 24 a substantial distance, preferably equal to 0.25 to 1.0 times the width, measured for one side edge 36 to the other, of the bottom wall 30 of the trough 20, and most preferably 0.75 times the width of the trough. This increases the ability of the trough to flex during mixing and prevents a build-up of material in the trough. The axis of rotation of the shaft preferably lies in a horizontal plane passing through the side edges 36 of the bottom wall 30 of the trough and is preferably coincident with the center of curvature of the bottom wall 30 of the trough.

Figure 4:
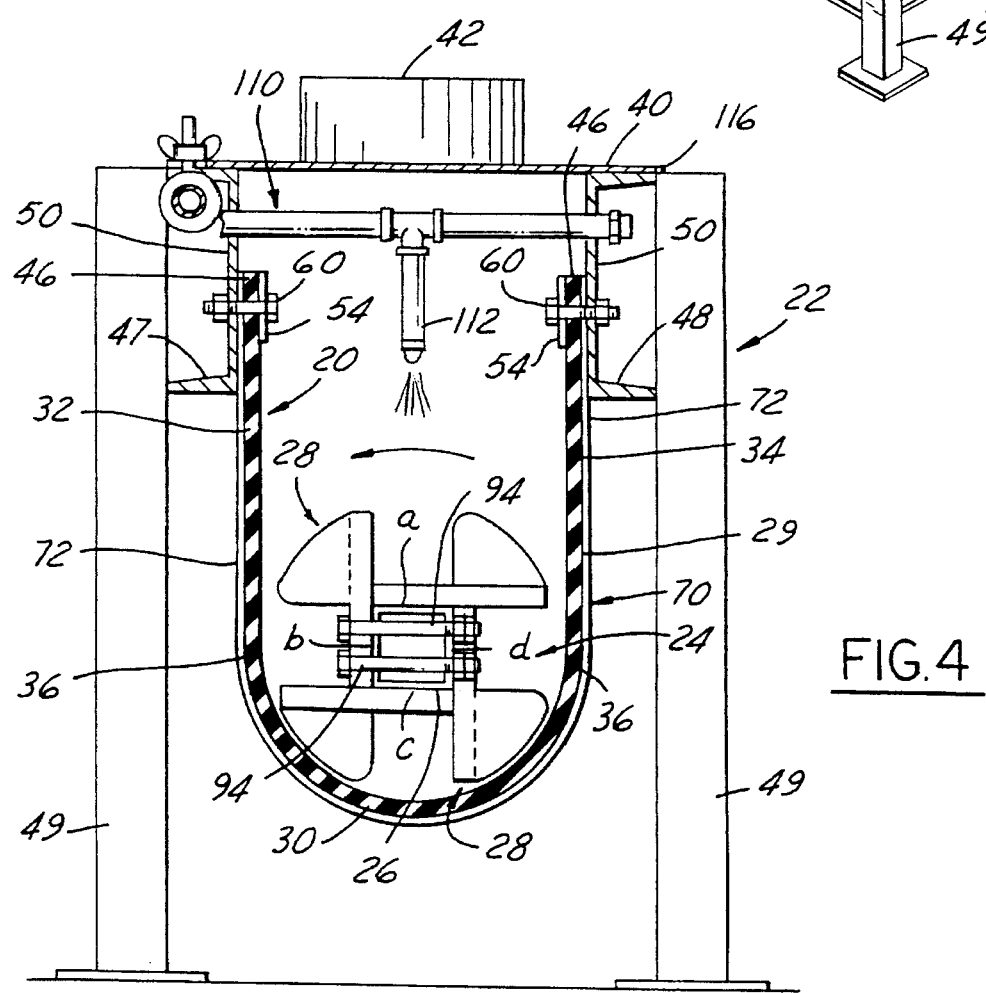
FIG. 4 is a sectional view taken on the line 4—4 in FIG. 2.

The suspension of the trough is augmented by hanger straps in the form of stirrups 70. The stirrups 70 are preferably in the form of rigid steel straps and are preferably uniformly spaced apart about 12" from each other along the length of the trough. Each stirrup 70 has vertical side portions 72 clamped between the upper edge portions 46 of the side walls of the trough and the channel bases 50 by the fasteners 60 which extend through the stirrups. The lower ends of the side portions of the stirrups 70 are integrally connected to the downwardly concave bottom portion of the stirrups. Thus, as seen in FIG. 4, the configuration of the stirrups is the same as the transverse configuration of the trough so that their side portions and bottom portion are in full surface-to-surface contact with the outer sides of the side and bottom walls of the trough. The stirrups do not significantly interfere with the ability of the trough to flex during mixing. Only at the opposite ends is the trough 20 rigidly secured to frame 22, as indicated by the stirrups 73 in FIGS. 1, 14 and 15.

The shaft 26 of the rotor assembly 24 preferably is in the form of a square tube, that is, it is tubular and of uniform square cross-section throughout its length. The four sides of the shaft are identified a, b, c, and d and face radially outwardly at 90° intervals around the shaft.

A plurality of paddles 28, each preferably cast in one piece of steel, iron or polyurethane, for example, are mounted on the shaft preferably in a helical array. (See FIGS. 4, 5 and 7–9) Each paddle has a straight elongated arm 88 with an integral blade 90 at the outer end of the arm. The arm has a pair of longitudinally spaced openings 92 to receive fasteners 94 for securing the arm to one of the sides a, b, c or d of the shaft. The openings 92 may be elongated lengthwise of the arm to permit adjustment of the paddles. The blade 90 at the outer end of the arm is generally right triangular and has surfaces 96 and 98 facing away from each other axially of the shaft.

Each arm 88 has a flat mounting surface 89 in flush engagement with a side a, b, c or d of the shaft, and extends in a plane perpendicular to the shaft axis. The blade 90 on the end of each arm is disposed radially outwardly of the shaft axis. To describe the arrangement of the paddles 28, starting with the paddle nearest the inlet end 38 of the trough 20, that blade 90 may be assumed to be secured to the surface a of the shaft 26. Then proceeding axially toward discharge tube 44 at the discharge end of the trough 20, the next paddle 28 is attached to the surface b of the shaft, the next to surface c, the next to surface d, the next to surface a, and so on to the last paddle adjacent the discharge end. The paddles 28 are thus arranged in four rows axially of the shaft, with ¼ of the total number of paddles in each row.

The surface 96 of each blade 90 is disposed in a plane perpendicular to the mounting surface 89 and to the shaft axis and faces the inlet end 38. The surface 98 of each blade is at an acute angle to the mounting surface 89 and to the shaft axis and faces in the opposite direction, that is, toward the discharge end to move the material in the trough 20 in the direction of discharge. The angle between the surfaces 96 and 98 of each blade may vary but preferably is 15°–30°. The surface 98 of each blade 90 angles toward the surface 96 and the two surfaces converge to form a curved tip or outer edge which matches the curvature of the bottom wall of the trough and preferably is spaced therefrom 1/4" to 1/2".

In many applications of the apparatus of this invention, additional paddles 100 (FIGS. 10–12) are used in place of one or more of the paddles 28. The paddles 100 are generally like the paddles 28 except that the surfaces 102 and 104, respectively like surfaces 98 and 96 of paddles 28, are reversed so that the angled paddle surfaces 102 face the inlet end and the surfaces 104 face the discharge end. As such, the paddles 100 have a tendency to move the material in the trough toward the inlet end and thereby retard movement of the material to the discharge end. By replacing one or more of the paddles 28 with a paddle or paddles 100, the length of time the material remains in the trough and hence the amount of mixing will be lengthened.

Figure 6:
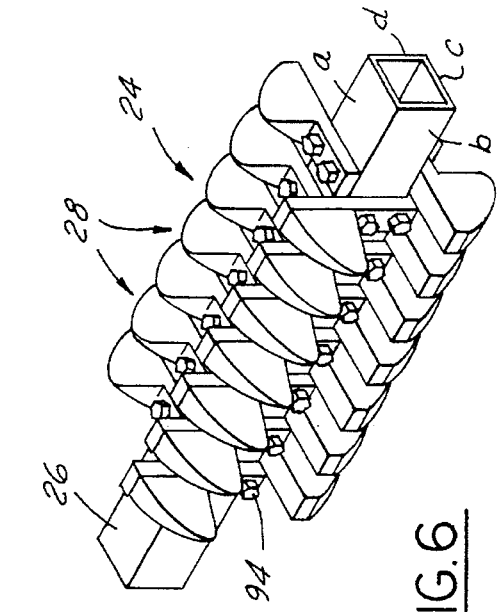
FIG. 6 is a fragmentary perspective view of a modification showing a double helix arrangement of paddles.
Figure 5:
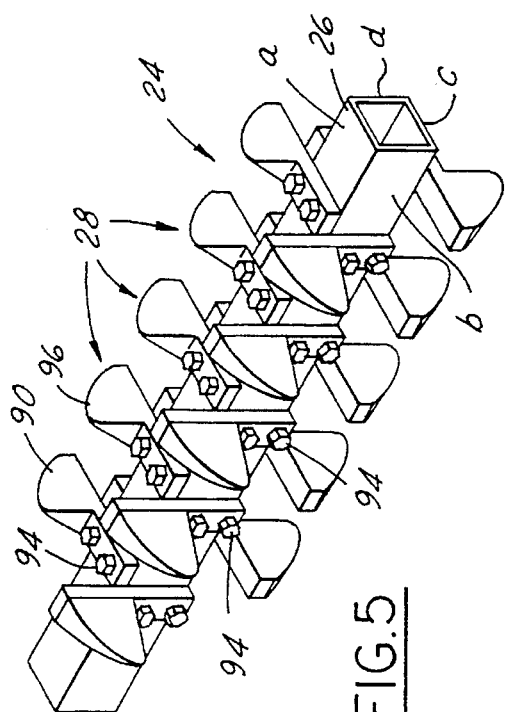
FIG. 5 is a fragmentary perspective view showing a single helix arrangement of paddles on the shaft of the rotor assembly.

FIG. 5 shows a single helix arrangement of the paddles. FIG. 6 shows a double helix arrangement of the same hand and lead with the paddles of the second helix following a helical path in the space between turns of the first helix. The double helix arrangement provides approximately twice as much mixing in the same space. The double helix arrangement is desirable when the width of the trough exceeds 30 to 36 inches.

A plurality of transverse spray headers or pipes 110 are secured to the frame and disposed in longitudinally spaced relation over the trough adjacent the inlet end. Spray atomizing nozzles 112 extend downward from the pipes and spray liquid, usually water, into the trough to mix with the material introduced to the trough through inlet tube 42. The top panel 114 of the frame is hinged at 116 for swinging movement to an open position as seen in FIG. 1 to permit access to the spray headers 110. When closed, panel 114 cooperates with other top panels 40 and 115 to cover the area above the trough and prevent dust from escaping during operation of the machine.

Spindles 120 and 122 have cylindrical or square-shaped inner ends 124 secured in the opposite ends of the shaft 26 (FIGS. 14 and 15). The spindles have cylindrical outer end portions 126 and 128 which extend axially beyond the shaft ends. The cylindrical outer end portion 126 of spindle 120 is journalled for rotation in a bearing sleeve 130 secured to the vertical end wall 132 at the inlet end of the machine frame. The cylindrical outer end portion 128 of spindle 122 is journalled for rotation in a bearing sleeve 134 secured to the vertical end wall 136 at the discharge end of the machine.

Figure 2:
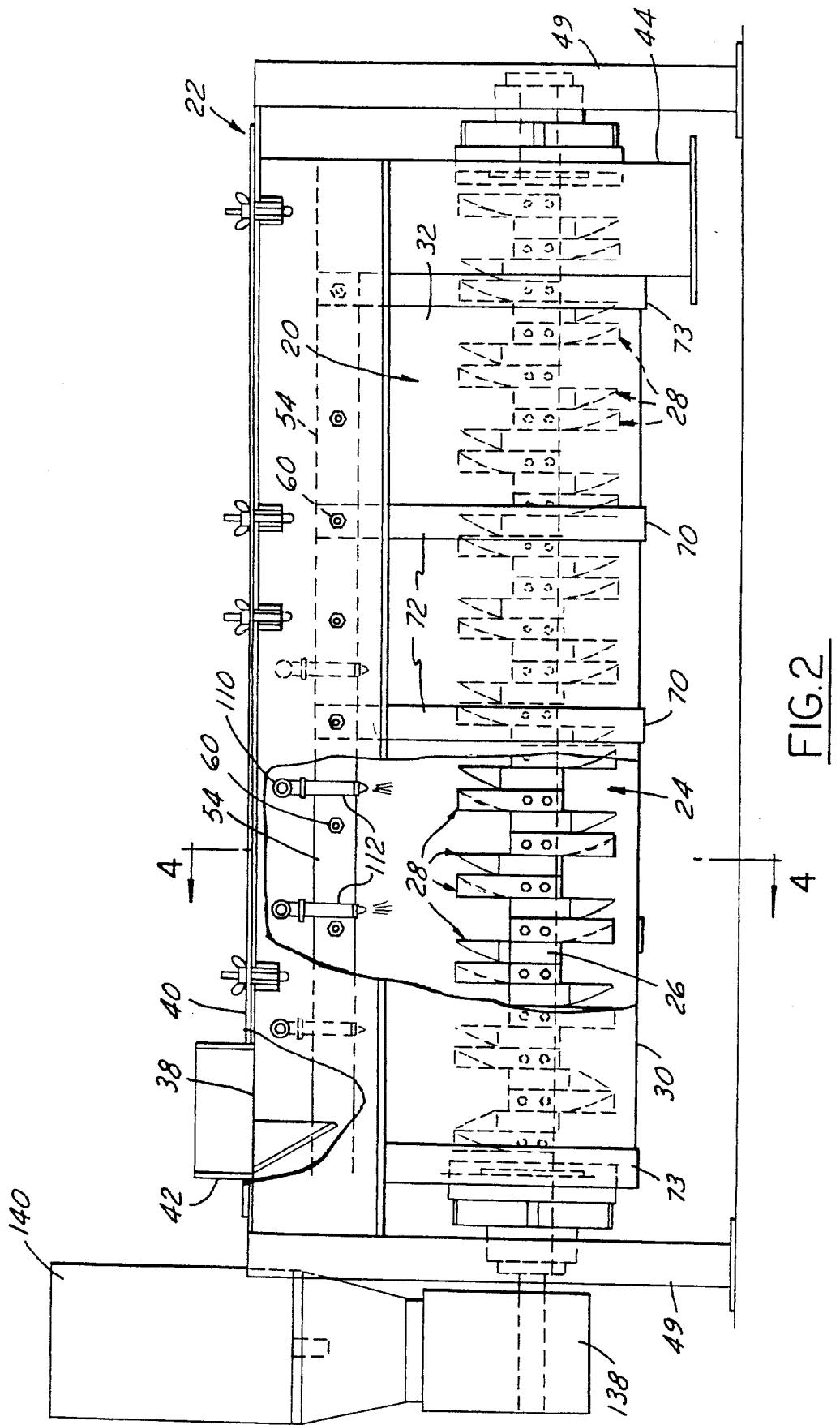
FIG. 2 is a front elevation of the mixing and conditioning machine of FIG. 1, with parts broken away.
Figure 3:
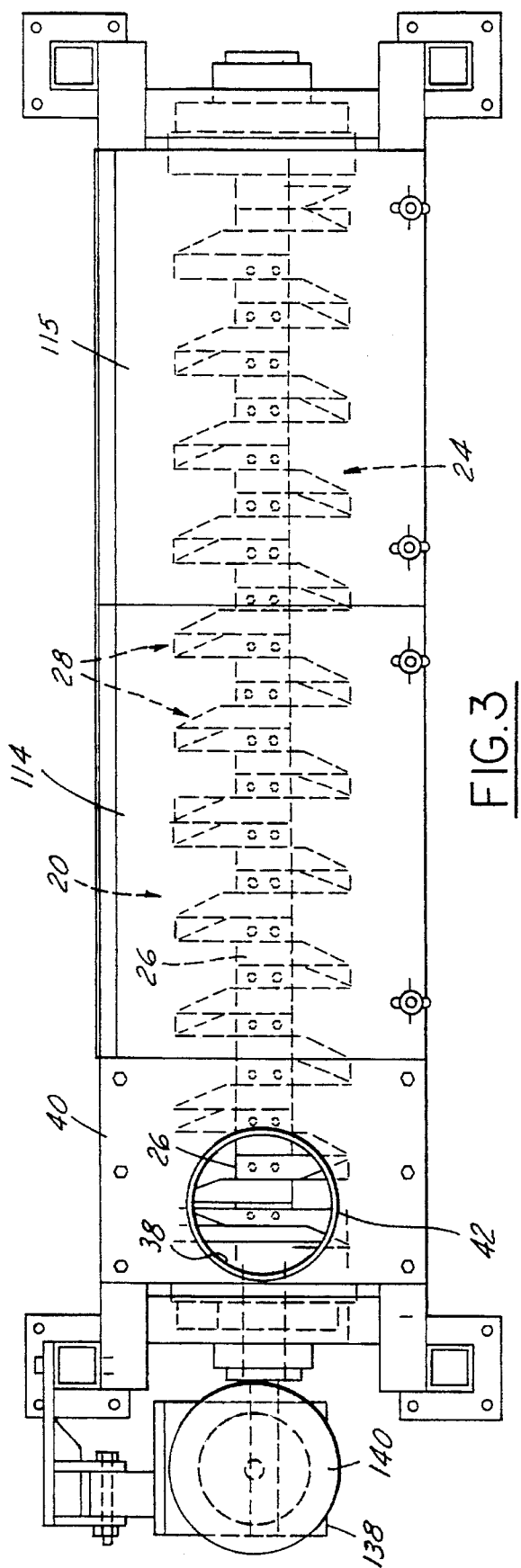
FIG. 3 is a top plan view of the machine.

The spindle 120 extends into a gear reducer 138 driven by an electric motor 140 (FIGS. 1 and 2). While this drive is shown located at the inlet end of the machine, it could just as easily be located at the discharge end. It has been found advantageous to provide a pulse width modulated electronic variable frequency speed controller for the motor 140 so that the speed of the paddles can be easily adjusted to promote the most efficient mixing. The motor turns the shaft 26 at a rate such that the blade tip speed is 700 to 900 feet per minute, and preferably about 750 feet per minute.

A labyrinth seal 142 comprises a pair of stationary radial annular sealing discs 144 and 146 which surround the spindle 120 at the inlet end and are secured to the inner side of the end wall 132 of the frame. The discs 144 and 146 are formed of a resinous plastic material, preferably an ultra high molecular weight polyethylene or polypropylene. The sealing disc 144 is secured flat against sealing disc 146, but has an annular recess 148 to receive a radial metal plate 150 secured to the spindle 120. The plate 150 extends into the recess and is sandwiched between the two discs in sealing contact therewith.

A labyrinth seal 156 comprises a pair of stationary radial annular sealing discs 158 and 160, of the same material as discs 144 and 146, which surround the spindle 122 at the discharge end and are secured to the inner side of the end wall 136 of the frame. The sealing disc 158 is secured flat against sealing disc 160, but has an annular recess 164 to receive a radial metal plate 166 secured to the spindle 122. The plate 166 is disposed in the recess and sandwiched between the two discs in sealing contact therewith.

The seals 142 and 156 are provided to keep the material from escaping the trough. Each seal can be air-purged by introducing air through a channel 167 into the recess between the sealing discs to clear away any material that may have gotten into the recess.

Figure 13:
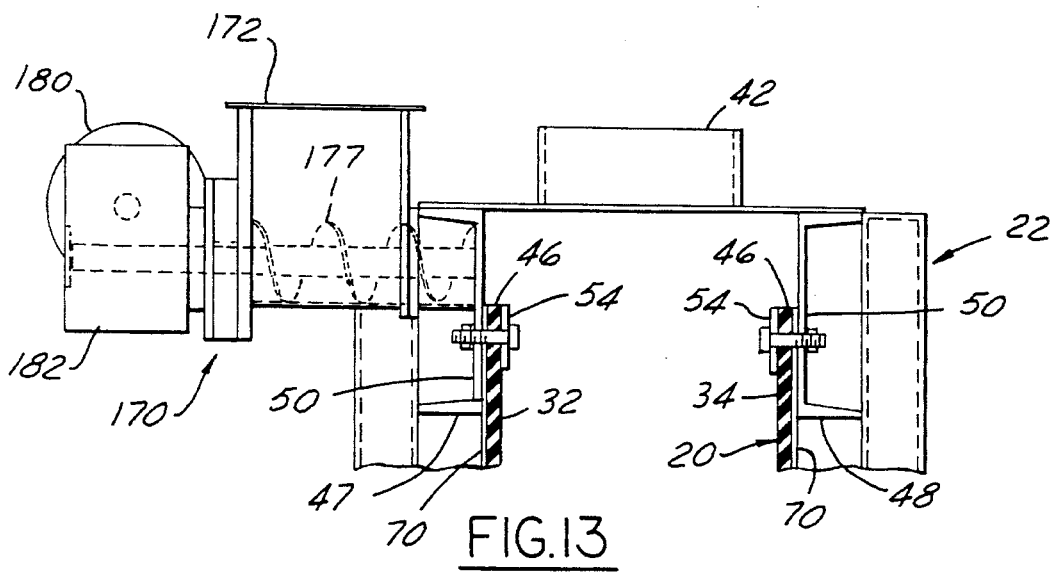
FIG. 13 is a fragmentary transverse sectional view of a modification.

In some instances, it is desirable to feed more than one material into the trough at the inlet end. The inlet tube 42 may be used to feed one of the materials, such as a dust mixture to be pelletized, and a separate screw feeder 170 shown in FIG. 13 may be provided to introduce a second material, such as recycle material or a second ingredient when manufacturing fertilizer. The screw feeder 170 includes a hopper 172 to receive the second material which is introduced into the trough by a rotary screw 177. The screw 177 is driven by an electric motor 180 through a speed reducer 182. In order to provide speed control for the screw feeder, there may be provided a pulse width modulated electronic variable frequency speed controller for the motor. Adjustment of the speed of the screw will, of course, control the rate at which material is added to the trough. The screw feeder is secured to the side of the frame adjacent the inlet end by any suitable means and while it is shown located at one side of the trough, it can just as well be located at the opposite side of the trough.

In operation, the dust, powder or like fine particulate material is fed into the trough through the inlet 38. Additional material, such as recycle or a second ingredient, may be introduced by the screw feeder 170. A liquid such as ordinary tap water is sprayed on the material in the trough by the spray nozzles 112. A heavy, grainy slurry of material is formed. The paddles of the rotor assembly 24 mix and condition and pelletize the material and move it toward the outlet end for discharge through the outlet tube 44. The rotation of the paddles in the material causes the trough to vibrate and flex, controlled but not appreciably restrained by the hanger stirrups. The flexing of the rubber-like trough is desirable because it prevents a build-up of material developing on the inner surfaces of the trough.

Figure 8:
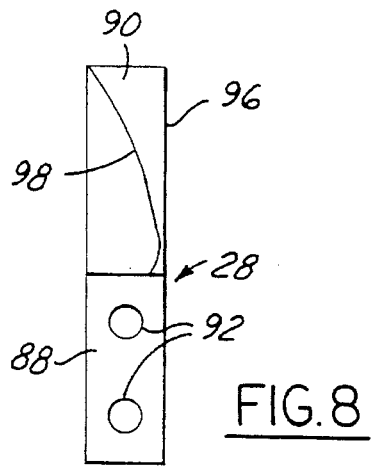
FIG. 8 is a top plan view of the paddle in FIG. 7.
Figure 7:
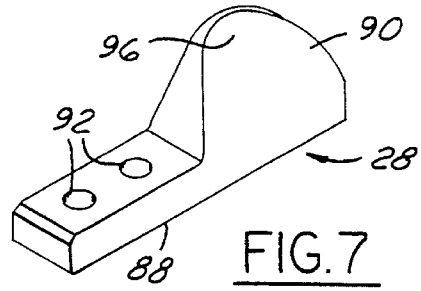
FIG. 7 is a perspective view one of the paddles.
Figure 9:
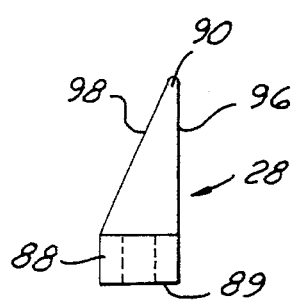
FIG. 9 is a side view of the paddle in FIGS. 7 and 8.
Figure 11:
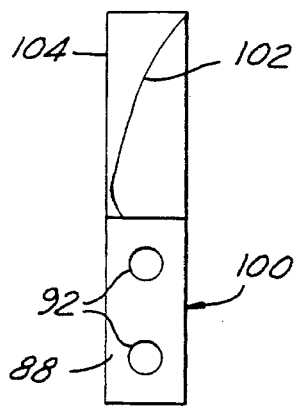
FIG. 11 is a top plan view of the paddle in FIG. 10.
Figure 10:
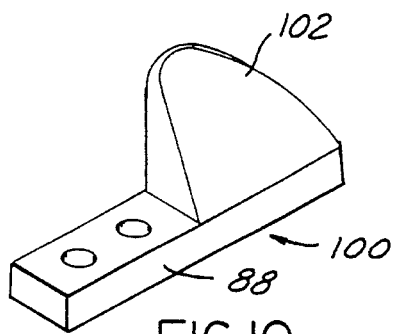
FIG. 10 is a perspective view of a paddle of a different construction.
Figure 12:
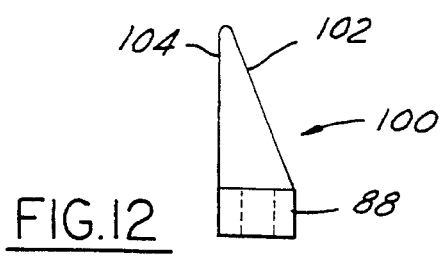
FIG. 12 is a side view of the paddle in FIGS. 10 and 11.

All of the paddles may be of the construction shown in FIGS. 7–9 with angled surfaces 98 for urging the material toward the discharge end, or, to slow the advance of the material and increase the time of mixing in the trough, one or more of the paddles may be of the FIG. 10–12 construction in which the angled surface faces the inlet end.

The capacity of the machine is dependent upon the total of the blade area in the trough. A 12-inch wide trough, 5 feet long, will have a capacity of 60 cu.ft./hr. A 24-inch wide trough, 10 feet long, will have a capacity of 470 cu.ft./hr. The normal dust (dust with a bulk density of 80 lbs./cu.ft.) requires approximately 1 HP to process material at the rate of 15 to 17.5 cu.ft./hr. A 12-inch wide machine will require a 3 to 5 HP drive while a 24-inch wide machine will require a 25 to 30 HP drive.

The faster the rotation of the paddles, the greater the shearing and mixing of the materials and therefore the more power that is required. Likewise, the more paddles that are installed to restrain the movement of the material toward the discharge, the greater the retention time and the greater power that will be required.

The amount of water and the speed of the rotation of the paddles together control the size of the granules produced. For a given water or moisture addition, the faster the rotational speed of the paddles, the smaller the pellets. Also, for a given speed of the paddles, the more water that is added, the larger the pellet or granule size that is produced.

Granules can be produced by adding a filter cake along with dry material to the feed end of the machine. These two materials will be blended together to produce a granule with uniform moisture.

We have demonstrated that dicalcium phosphate can be produced by introducing ground limestone (minus 200 mesh) into the trough through the inlet 38, recycle dicalcium phosphate can be introduced through screw feeder 170, a 40% solution of phosphoric acid can be sprayed on the material. A chemical reaction takes place between the limestone and the phosphoric acid to produce dicalcium phosphate.

We claim:

1. A mixing and conditioning machine comprising a frame, an elongated, generally horizontal trough formed of flexible material and having opposite end portions provided respectively with an inlet and an outlet, said trough including a downwardly concave bottom wall having laterally spaced side edges, said trough also including laterally spaced side walls extending upwardly from the respective side edges of the bottom wall having upper attaching portions disposed a substantial distance above the side edges of the bottom wall, a rotor assembly comprising an elongated, generally horizontal shaft extending within the trough lengthwise thereof, a plurality of paddles extending transversely from the shaft along the length thereof, means for axially rotating the shaft to cause the paddles to mix and pelletize material introduced into the trough through the inlet and move such material toward the outlet for discharge, and means securing the attaching portions of the side walls of the trough to the frame to suspend the trough from said attaching portions and enable the side walls and bottom wall of the trough to flex as the shaft rotates and thereby prevent build-up of material in the trough, the attaching portions of the side walls of the trough being spaced above the axis of rotation of the shaft a distance equal to at least ¼ of the width of the trough measured between the side edges thereof.

2. A mixing and conditioning machine according to claim 1, wherein the distance of the attaching portions of the side walls above the axis of rotation of the shaft does not substantially exceed the width of the trough.

3. A mixing and conditioning machine according to claim 1, wherein the attaching portions of the side walls of the trough are spaced above the axis of rotation of the shaft a distance equal to about ¾ of the width of the trough measured between the side edges thereof.

4. A mixing and conditioning machine according to claim 1, wherein the length of the trough is 4 to 5 times the width thereof.

5. A mixing and conditioning machine according to claim 1, wherein said rotating means rotates the shaft at a rate such that the blade speed is about 750 feet per minute.

6. A mixing and conditioning machine comprising a frame, an elongated, generally horizontal trough formed of flexible material and having opposite end portions provided respectively with an inlet and an outlet, said trough including a downwardly concave bottom wall having laterally spaced side edges, said trough also including laterally spaced side walls extending upwardly from the respective side edges of the bottom wall having upper attaching portions disposed a substantial distance above the side edges of the bottom wall, a rotor assembly comprising an elongated, generally horizontal shaft extending within the trough lengthwise thereof, a plurality of paddles extending transversely from the shaft along the length thereof, means for axially rotating the shaft to cause the paddles to mix and pelletize material introduced into the trough through the inlet and move such material toward the outlet for discharge, and means securing the attaching portions of the side walls of the trough to the frame to suspend the trough from said attaching portions and enable the side walls and bottom wall of the trough to flex as the shaft rotates and thereby prevent build-up of material in the trough, wherein the trough is supported and cradled by stirrups spaced apart lengthwise thereof.

7. A mixing and conditioning machine comprising a frame, an elongated generally horizontal trough formed of flexible material and having opposite end portions provided respectively with an inlet and an outlet, said trough including a downwardly concave bottom wall having laterally spaced side edges, said trough also including laterally spaced side walls extending upwardly from the respective side edges of the bottom wall having upper attaching portions disposed a substantial distance above the side edges of the bottom wall, a rotor assembly comprising an elongated, generally horizontal shaft extending within the trough lengthwise thereof, a plurality of paddles extending transversely from the shaft along the length thereof, means for axially rotating the shaft to cause the paddles to mix and pelletize material introduced into the trough through the inlet and move such material toward the outlet for discharge, means securing the attaching portions of the side walls of the trough to the frame to suspend the trough from said attaching portions and enable the side walls and bottom wall of the trough to flex as the shaft rotates and thereby prevent build-up of material in the trough, the bottom wall of the trough being semi-cylindrical throughout its length with its opposite side edges occupying a horizontal plane passing through the axis of rotation of the shaft, and the side walls of the trough occupying laterally spaced apart, vertical, parallel planes, and arcuate stirrups to support and cradle the trough, said stirrups being spaced apart along the length of the trough, said stirrups each having vertical side portions extending along the side walls of the trough and an arcuate bottom portion extending under the bottom wall of the trough.

8. A mixing and conditioning machine comprising a frame, an elongated generally horizontal trough formed of flexible material and having opposite end portions provided respectively with an inlet and an outlet, said trough including a downwardly concave bottom wall having laterally spaced side edges, said trough also including laterally spaced side walls extending upwardly from the respective side edges of the bottom wall having upper attaching portions disposed a substantial distance above the side edges of the bottom wall, a rotor assembly comprising an elongated, generally horizontal shaft extending within the trough lengthwise thereof, a plurality of paddles extending transversely from the shaft along the length thereof, means for axially rotating the shaft to cause the paddles to mix and pelletize material introduced into the trough through the inlet and move such material toward the outlet for discharge, and means securing the attaching portions of the side walls of the trough to the frame to suspend the trough from said attaching portions and enable the side walls and bottom wall of the trough to flex as the shaft rotates and thereby prevent build-up of material in the trough, said paddles being arranged helically in spaced apart relation about the axis of the shaft and along the length of the shaft, said paddles each having an outer end provided with a blade, each blade having first and second surfaces facing away from each other generally axially of the shaft, the first surface of each blade being disposed in a plane perpendicular to the axis of the shaft and the second surface being disposed at an angle to a plane perpendicular to the axis of the shaft to move material axially of the trough.

9. A mixing and conditioning machine according to claim 8, wherein the second surface of each blade is angled toward the first surface thereof and said first and second surfaces of each blade converge to form a curved tip of the blade.

10. A mixing and conditioning machine according to claim 8, wherein at least one of the paddles is arranged such that the second surface of the blade thereof faces the end portion of the trough adjacent the inlet and the remaining paddles are arranged such that the second surface of each of the blades thereof face the end portion of the trough adjacent the outlet.

11. A mixing and conditioning machine according to claim 8, wherein said first and second surfaces of the blade of each paddle form an angle of 15°–30°.

12. A mixing and conditioning machine comprising a frame, an elongated, generally horizontal trough formed of flexible material and having opposite end portions provided respectively with an inlet and an outlet, said trough including a downwardly concave bottom wall having laterally spaced side edges, said trough also including laterally spaced side walls extending upwardly from the respective side edges of the bottom wall having upper attaching portions disposed a substantial distance above the side edges of the bottom wall, a rotor assembly comprising an elongated, generally horizontal shaft extending within the trough lengthwise thereof, a plurality of paddles extending transversely from the shaft along the length thereof, means for axially rotating the shaft to cause the paddles to mix and pelletize material introduced into the trough through the inlet and move such material toward the outlet for discharge, and means securing the attaching portions of the side walls of the trough to the frame to suspend the trough from said attaching portions and enable the side walls and bottom wall of the trough to flex as the shaft rotates and thereby prevent build-up of material in the trough, and a reinforced backing applied to the outer surface of the trough.

13. A mixing and conditioning machine comprising a frame, an elongated, generally horizontal trough formed of flexible material and having opposite end portions provided respectively with an inlet and an outlet, said trough including a downwardly concave bottom wall having laterally spaced side edges, said trough also including laterally spaced side walls extending upwardly from the respective side edges of the bottom wall having upper attaching portions disposed a substantial distance above the side edges of the bottom wall, a rotor assembly comprising an elongated, generally horizontal shaft extending within the trough lengthwise thereof, a plurality of paddles extending transversely from the shaft along the length thereof, means for axially rotating the shaft to cause the paddles to mix and pelletize material introduced into the trough through the inlet and move such material toward the outlet for discharge, means securing the attaching portions of the side walls of the trough to the frame to suspend the trough from said attaching portions and enable the side walls and bottom wall of the trough to flex as the shaft rotates and thereby prevent build-up of material in the trough, a labyrinth seal for one end of the shaft, said seal comprising a pair of stationary sealing discs of resinous plastic material defining a recess therebetween, and a metal plate affixed to said one end of the shaft and sandwiched in the recess between the discs in sealed relationship therewith.

14. A mixing and conditioning machine according to claim 13, and further including means for introducing air to the labyrinth seal to clear away any of the material in the recess.

15. A mixing and conditioning machine comprising a frame, an elongated, generally horizontal trough formed of flexible material and having opposite end portions provided respectively with an inlet and an outlet, said trough including a downwardly concave bottom wall having laterally spaced side edges, said trough also including laterally spaced side walls extending upwardly from the respective side edges of the bottom wall having upper attaching portions disposed a substantial distance above the side edges of the bottom wall, a rotor assembly comprising an elongated, generally horizontal shaft extending within the trough lengthwise thereof, the bottom wall of the trough being semi-cylindrical throughout its length with its opposite side edges occupying a horizontal plane passing through the axis of rotation of the shaft, and the side walls of the trough occupying laterally spaced apart, vertical, parallel planes, the attaching portions of the side walls of the trough being spaced above the axis of rotation of the shaft a distance equal to at least about ¼ of the width of the trough and not more than the full width of the trough measured between the side edges thereof, a plurality of paddles extending transversely from the shaft along the length thereof, means for axially rotating the shaft to cause the paddles to mix and pelletize material introduced into the trough through the inlet and move such material toward the outlet for discharge, and means securing the attaching portions of the side walls of the trough to the frame to suspend the trough from said attaching portions and enable the side walls and bottom wall of the trough to flex as the shaft rotates and thereby prevent build-up of material in the trough, said paddles being arranged helically in spaced apart relation about the axis of the shaft and along the length of the shaft, said paddles each having an outer end provided with a blade, each blade having first and second surfaces facing away from each other generally axially of the shaft, the first surface of each blade being disposed in a plane perpendicular to the axis of the shaft and the second surface being disposed at an angle to a plane perpendicular to the axis of the shaft to move material axially of the trough, and said first and second surfaces of the blade of each paddle form an angle of 15°–30°.

16. A mixing and conditioning machine according to claim 15, wherein at least one of the paddles is arranged such that the second surface of the blade thereof faces the end portion of the trough adjacent the inlet and the remaining paddles are arranged such that the second surface of each of the blades thereof face the end portion of the trough adjacent the outlet.

17. A mixing and conditioning machine according to claim 16, wherein arcuate stirrups are provided to support and cradle the trough, said stirrups being spaced apart about 12 inches from one another along the length of the trough, said stirrups each having vertical side portions extending along the side walls of the trough in full surface contact therewith and an arcuate bottom portion extending under the bottom wall of the trough in full surface contact therewith.

18. A mixing and conditioning machine according to claim 17, wherein the length of the trough is 4 to 5 times the width thereof.

19. A mixing and conditioning machine according to claim 18, and further including a labyrinth seal for one end of the shaft, said seal comprising a pair of stationary sealing discs of resinous plastic material defining a recess therebetween, a metal plate affixed to said one end of the shaft and sandwiched in the recess between the discs in sealed relationship therewith, and means for introducing air to the labyrinth seal to clear away any of the material in the recess.

20. A mixing and conditioning machine according to claim 19, wherein the paddles are arranged in two helices about the axis of and along the length of the shaft.

21. A mixing and conditioning machine according to claim 20, wherein said rotating means rotates the shaft at a rate such that the blade speed is about 750 feet per minute.

22. A rotor assembly for use in a mixing and conditioning machine for converting dust, powder and other fine particles into pellets, said rotor assembly comprising:

an elongated rotatable shaft, a plurality of paddles arranged in spaced apart relation about the axis of and along the length of the shaft, said paddles each having an outer end provided with a blade, each blade having first and second surfaces facing away from each other generally axially of the shaft, the first surface of each blade being disposed in a plane perpendicular to the axis of the shaft and the second surface being disposed at an angle to a plane perpendicular to the axis of the shaft to move material axially of the shaft when the paddle is rotated.

23. A rotor assembly according to claim 22, wherein the second surface of the blade of each paddle is angled toward the first surface thereof, said first and second surfaces of each blade converging to form a curved tip of the blade.

24. A rotor assembly according to claim 23, wherein said first and second surfaces of the blade of each paddle form an angle of 15°–30°.

25. A rotor assembly according to claim 22, wherein at least one of the paddles is arranged such that the second surface of the blade thereof faces in one direction axially of the shaft and the remaining paddles are arranged such that the second surface of each of the blades thereof face in a direction opposite said one direction.

26. A rotor assembly according to claim 22, wherein said paddles are arranged helically about the axis of and along the length of the shaft.

27. A rotor assembly according to claim 22, wherein the paddles are arranged in two helices about the axis of and along the length of the shaft.

28. A mixing paddle for use in a mixing and conditioning machine for converting dust, powder and other fine particles into pellets, said paddle having an elongated arm provided with a flat mounting surface for mounting the paddle, said paddle having an outer end formed with an integral blade, said blade having a first surface disposed in a plane perpendicular to said mounting surface facing in one direction, and said blade having a second surface disposed at an acute angle to said first surface and facing in a direction opposite said one direction.

29. A mixing paddle according to claim 28, wherein the second surface of the blade of the paddle is angled toward the first surface thereof, said first and second surfaces of the blade converging to form a curved tip of the blade.

30. A mixing paddle according to claim 29, wherein said first and second surfaces of the blade form an angle of 15° to 30°.

* * * * *